United States Patent [19]
Shukla et al.

[11] Patent Number: 5,809,550
[45] Date of Patent: Sep. 15, 1998

[54] METHOD AND APPARATUS FOR PUSHING A CACHEABLE MEMORY ACCESS OPERATION ONTO A BUS CONTROLLER QUEUE WHILE DETERMINING IF THE CACHEABLE MEMORY ACCESS OPERATION HITS A CACHE

[75] Inventors: Rahul Shukla, Tempe; Jay Heeb, Gilbert; Timothy Jehl, Chandler, all of Ariz.

[73] Assignee: Intel Corporation, Santa Clara, Calif.

[21] Appl. No.: 833,573

[22] Filed: Apr. 7, 1997

Related U.S. Application Data

[63] Continuation of Ser. No. 316,391, Sep. 30, 1994, abandoned.

[51] Int. Cl.$^6$ .............................. G06F 13/00; G06F 12/00
[52] U.S. Cl. .......................... 711/167; 711/118; 711/135; 711/138; 711/168
[58] Field of Search ................................ 711/135, 138, 711/168, 169, 167, 118; 395/800.43

[56] References Cited

U.S. PATENT DOCUMENTS

| | | | |
|---|---|---|---|
| 4,354,232 | 10/1982 | Ryan ........................................ | 711/118 |
| 4,425,615 | 1/1984 | Swenson et al. ........................ | 711/114 |
| 4,881,163 | 11/1989 | Thomas et al. ......................... | 395/876 |
| 5,155,831 | 10/1992 | Emma et al. ............................ | 711/121 |
| 5,226,146 | 7/1993 | Milia et al. .............................. | 711/141 |
| 5,379,379 | 1/1995 | Becker et al. ............................. | 711/3 |
| 5,388,245 | 2/1995 | Wong ...................................... | 711/118 |
| 5,398,325 | 3/1995 | Chang et al. ............................... | 711/3 |
| 5,426,765 | 6/1995 | Stevens et al. .......................... | 711/131 |
| 5,459,839 | 10/1995 | Swarts et al. ........................... | 395/297 |
| 5,471,591 | 11/1995 | Edmondson et al. .................... | 395/393 |
| 5,506,967 | 4/1996 | Barajas et al. .......................... | 711/118 |
| 5,515,521 | 5/1996 | Whitted, III et al. ....................... | 711/3 |

OTHER PUBLICATIONS

Intel Corporation, *i750, i960 & i960 Procesors and Related Products*, 1993, pp. 3–325 to 3–300.
Intel Corporation, *i960 Cx Microprocessor User's Manual*, Mar. 1994, in its entirety.

*Primary Examiner*—Eddie P. Chan
*Assistant Examiner*—Hong C. Kim
*Attorney, Agent, or Firm*—Blakely, Sokoloff, Taylor & Zafman

[57] ABSTRACT

A method and apparatus for hit-dependent flushing of cacheable memory access operations in a bus controller queue is described. The present invention is implemented in the context of a computer system including a microprocessor coupled to an external memory device through an external bus. The processor includes a processor core for issuing memory access operations, a cache, and a bus controller. The bus controller includes a queue having slots for storing pending memory access operations to be sent out over the external bus. After a first memory access operation is issued, the bus controller stores the first memory access operation in a first queue slot before it is determined whether the first operation hits or misses the cache. The bus controller flushes the first operation from the queue if the first operation hits the cache. In response to the processor core issuing a second memory access operation, the bus controller stores the second memory access operation in the first queue slot if the first operation hits the cache. If, on the other hand, the first operation misses the cache, then the bus controller stores the second memory access operation in a second queue slot. Preferably, the first operation is issued in a first cycle and stored in the first queue slot in a second cycle that immediately follows the first cycle, and the second operation is issued in the second cycle.

15 Claims, 5 Drawing Sheets

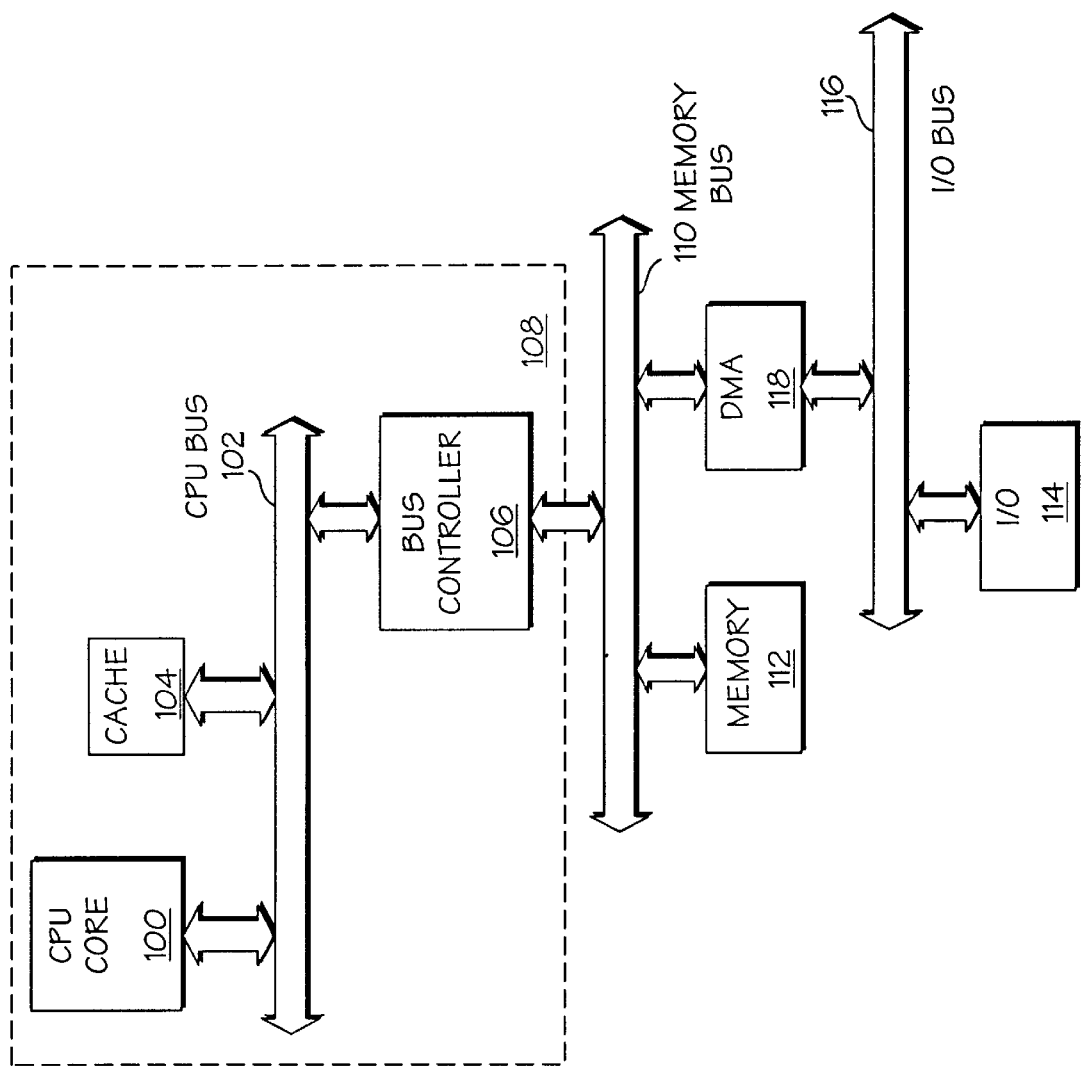

METHOD AND APPARATUS FOR PUSHING A CACHEABLE MEMORY ACCESS OPERATION ONTO A BUS CONTROLLER QUEUE WHILE DETERMINING IF THE CACHEABLE MEMORY ACCESS OPERATION HITS A CACHE

This is a continuation of application Ser. No. 08/316,391, filed Sep. 30, 1994, now abandoned.

BACKGROUND OF THE INVENTION

1. Field of the Invention

The present invention relates to the field of microprocessor bus controllers, and in particular to improving the performance of a bus controller for cacheable memory access operations.

2. Description of the Related Art

Microprocessors frequently execute memory access operations which retrieve data from main memory for storage in a microprocessor register. However, the advent of on-chip caches has made it possible to maintain a local copy of data which can be retrieved much more quickly. As a result, controlling where to obtain the desired data becomes an issue. For example, in a system incorporating a cache, a cacheable load operation will first attempt to retrieve the requested information from the cache. If a cache miss results, then the data must be retrieved from main memory. In response, the retrieved information is loaded into the specified register and the information in the cache is updated for future references. In the case of a noncacheable load operation, the processor will bypass the cache and attempt to retrieve the data directly from main memory.

When a cacheable load operation misses the cache, it may take many cycles for the data to be returned from main memory. One cause of this delay is arbitration for the memory bus by different bus agents. During this delay period, the pending cacheable load operation is typically stored in a slot in a bus queue of a bus controller. The bus queue is used as a buffer between the processor core and the memory bus. The bus queue slots maintain, among other information, the specified addresses of memory accesses that are transmitted to or received from the memory bus. The bus queue slots also maintain attributes concerning each queued access. As is well known in the art, the bus queue slot may also store a valid/invalid bit or use head and tail pointers to indicate which queue slots are valid, i.e., still pending and not yet filled. For a load, a slot is considered filled when requested data returns from external memory to the bus queue, but has not yet returned to a register file within the CPU core. A fill to a data cache results when the requested data returns to the register file from the bus queue over an internal memory bus. When that happens, the corresponding queue slot will be flushed. The flush operation may be indicated by manipulating the pointers or resetting the valid bit of the flushed slot to indicate an invalid slot. The flushed slot provides room in the queue for another pending memory access operation.

Another cause of performance degradation in conventional microprocessors is the time it takes to perform a tag comparison to determine whether a cacheable load should be pushed onto the bus controller queue or return data from an associated cache. If the load address hits the processor cache, then the cache returns the requested data to the processor core and the load is not queued for service by the bus controller. On the other hand, if the load request misses the processor cache, then the load must be transferred to the bus controller queue in the next cycle in order to wait for access to external memory. This gives rise to a potential "collision" between a load/store instruction issued from the core in a subsequent cycle.

Through a technique known as "scoreboarding," these collisions are avoided. After the issuance of a cacheable load, conventional processors stall the issue of subsequent so-called "memory side" instructions in the next cycle that may require an external memory access. Memory side instruction issue is stalled in order to avoid a conflict in which two consecutive instructions are waiting for the determination of whether they must be sent to the bus controller queue. After completion of the tag comparison, if the load misses the cache, then during the subsequent cycle it is stored in the bus controller queue and the next instruction is permitted to issue in the next cycle. Thus, there is a "dead time" in between the issue of a cacheable load and the subsequent instruction.

Such a loss of processor cycles severely degrades processor performance because cacheable loads frequently occur in processor routines, and each load will cause one or more dead cycles.

SUMMARY OF THE INVENTION

The present invention provides a method and apparatus for hit-dependent flushing of cacheable memory access operations in a bus controller queue. The present invention is implemented in the context of a computer system including a microprocessor coupled to an external memory device through an external bus. The processor includes a processor core for issuing memory access operations, a cache memory device coupled to the processor core, and a bus controller that is coupled to the processor core, the cache and the external memory bus.

The bus controller includes a queue that serves as a buffer between the processor core and the external bus. The queue includes queue slots for storing pending memory access operations to be sent out over the external bus. The bus controller includes bus controller logic for storing a first memory access operation in a first slot of the queue. The bus controller logic flushes the first operation from the queue if the first operation is cacheable and hits the cache. In response to the processor core issuing a second memory access operation, the bus controller logic stores the second memory access operation in the first queue slot if the first operation hits the cache. If, on the other hand, the first operation misses the cache, then the bus controller logic stores the second memory access operation in a second queue slot.

In one embodiment, the queue includes a queue slot head pointer, and the bus controller logic further includes pointer logic for incrementing the queue slot head pointer to point to the second queue slot in response to the first operation missing the cache. Preferably, the bus controller logic also includes bypass logic for sending the first operation directly to the external bus if the first operation is noncacheable and the queue is empty. Preferably, the first operation is issued in a first cycle and stored in the first queue slot in a second cycle that immediately follows the first cycle, and the second operation is issued in the second cycle. Each cycle preferably consists of two phases. The bus control logic preferably flushes the first operation in the first phase of the second cycle (in response to a hit), and processor core issues the second memory access operation in the second phase of the second cycle.

BRIEF DESCRIPTION OF THE DRAWINGS

The objects, features and advantages of the present invention will be apparent to one skilled in the art in light of the following detailed description in which:

FIG. 1 illustrates a computer system incorporating the bus controller of the present invention.

DETAILED DESCRIPTION OF THE INVENTION

Figure 2A:
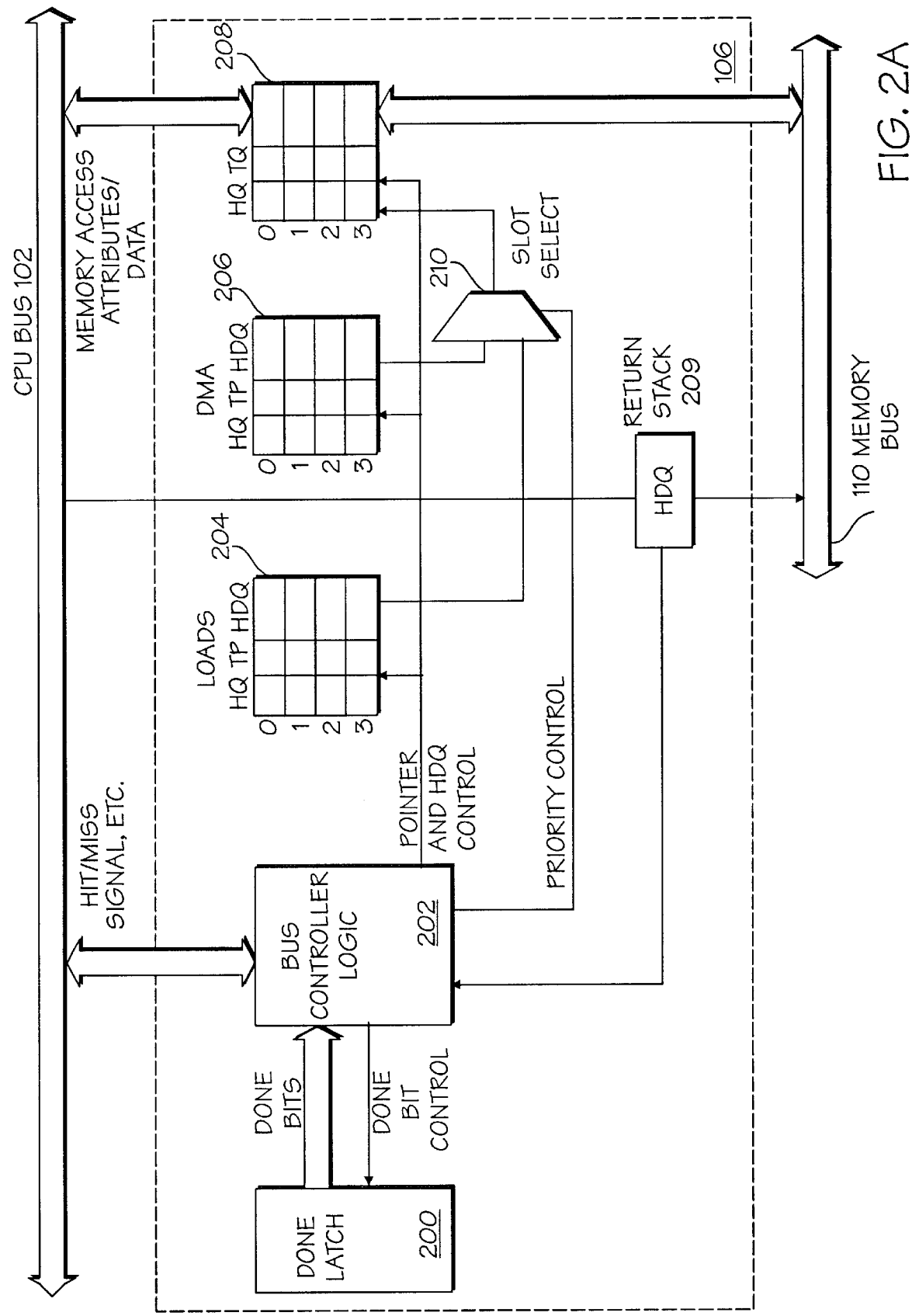
FIG. 2A illustrates the bus controller of the present invention.

The present invention provides a method and apparatus for hit-dependent flushing of cacheable memory access operations in a bus controller queue. For purposes of explanation, specific details are set forth to provide a thorough understanding of the present invention. However, it will be understood by one skilled in the art, from reading this disclosure, that the invention may be practiced without these details. Moreover, well-known elements, devices, process steps and the like are not set forth in order to avoid obscuring the invention.

FIG. 1 illustrates a computer system incorporating the bus controller of the present invention. A processor core 100 is coupled over an internal CPU bus 102 to a cache 104 and a bus controller 106 of the present invention. The processor core 100, the cache 104 and the bus controller 106 are preferably incorporated onto the same processor chip 108. Of course, one skilled in the art will recognize that the bus controller 106 may be coupled to a variety of other well-known processor configurations, and that the various units of the processor may reside on the same or different chips.

The bus controller 106 controls the transmission of memory access requests between the CPU core 100 and a memory bus 110. An external memory device 112 is coupled to the memory bus 110. Further, an I/O device 114 is coupled over an I/O bus 116 to a DMA controller 118, which is in turn coupled to the memory bus 110.

FIG. 2A illustrates the bus controller 106 of the present invention in more detail. The bus controller includes a DONE bit latch 200, bus controller logic 202, a load pending stack 204, a DMA pending stack 206, a queue slot stack 208, and a return stack 209. The pending stacks 204 and 206 and the queue slots 208 preferably include head pointers and tail pointers, which are controlled by the bus controller logic 202. One skilled in the art will recognize that in addition to, or in place of, the DMA pending stack, the bus controller may include pending stacks for other memory accesses. Preferably, the cache 104 serves as a data cache for pending load/store and DMA accesses.

Figure 2B:
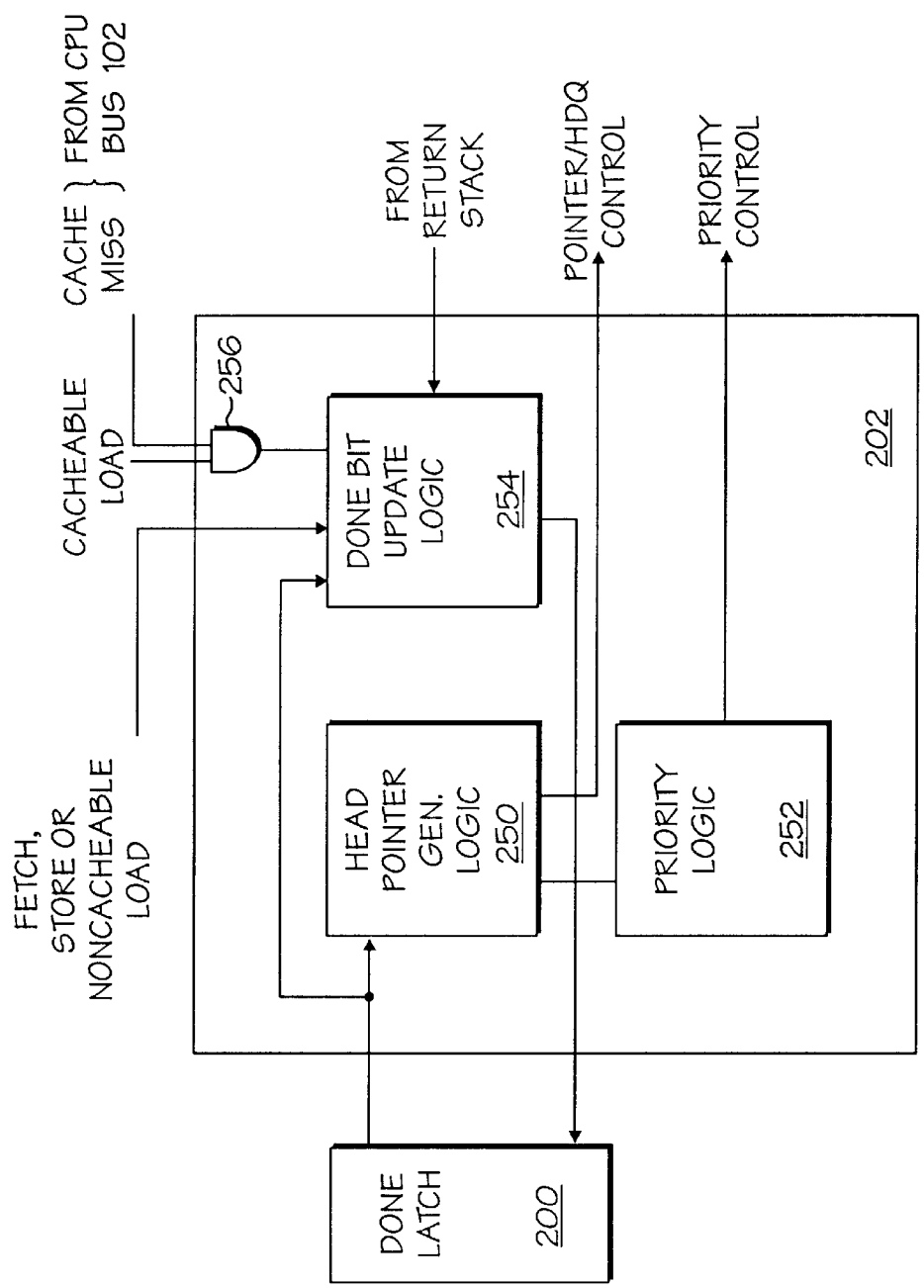
FIG. 2B is a detailed illustration of the bus controller logic of the present invention.

FIG. 2B is a diagram illustrating the functional blocks of the bus controller logic 202. Those skilled in the art will recognize that the arrangement of the functional blocks and their interconnections as shown in FIG. 2B are but one possible configuration for achieving the functionality of the bus controller logic 202 as described herein. The bus controller logic 202 includes head pointer generation logic 250, priority logic 252, DONE bit update logic 254 and an AND gate 256. The bus controller logic 202 receives information over the CPU bus 102 from the processor core (not shown) indicating whether a memory access request (preferably in the form of an instruction fetch, a store, a noncacheable load or a cacheable load) is issued. This information preferably comes from the instruction decoder (not shown) in the processor core. The bus control logic 202 also receives hit/miss information over the CPU bus 102 from cache tag comparison logic (not shown). The DONE bit update logic 254 receives an indication from the return stack 209 that indicates whether data is returning from the return stack 209 to the cache in the processor core, along with the pointer HDQ pointing to the queue slot occupied by the corresponding request.

The DONE latch 200 holds a sequence of DONE bits that indicate which queue slots 208 are free to accept incoming memory access requests and which slots are currently occupied with pending memory access requests. Preferably, a zero bit indicates that a slot is occupied while a one bit represents a free slot. For example, assume that the queue stack 208 is four entries deep: slot 0, slot 1, slot 2 and slot 3, with bit i of the DONE bits corresponding to slot i of the queue stack 208. For example, a DONE vector 1010 would indicate that queue slots 0 and 2 are occupied by pending memory access requests, while slots 1 and 3 are free to accept new requests. When the information requested by the access occupying slot 1 returns from external memory to the CPU core 100 after winning arbitration for the CPU internal bus 102, the return stack 209 indicates a data return to the DONE update logic 254, along with the pointer to the queue slot (slot 1) occupied by the corresponding request. In response, the DONE update logic 254 sets DONE bit 1 to 1 so that queue slot 1 may accept a new request. The manipulation of the DONE bits is performed by the bus controller logic 202, which monitors when requested information returns to the CPU core, and when information is placed upon the queue stack 208.

Through head pointer generation logic 250, configuration of the DONE bits 200 controls the head pointer (HQ) of the queue stack 208 and the head pointers (HP) of the pending stacks. The head pointers indicate which queue slots and pending stack entries are next to receive a memory access request that is to be sent out to external memory to retrieve data. Returning to the previous example of a DONE vector 1010, either slot 1 or slot 3 of the queue stack 208 may accept a new request. As a heuristic, the head pointer generation logic 250 may require the queue slot head pointer HQ to point to the lowest available slot number. Thus, in this case, the head pointer HQ would point to slot 1 to accept the next request from the CPU core 100. One skilled in the art will recognize that other methods of setting the head pointer may be used. When a request from the CPU core 100 is queued in slot 1, then the DONE bit update logic 254 updates the DONE vector to 1000 to account for this fact. In response to the new DONE vector, the head pointer logic 250 shifts the head pointer HQ left to point to slot 3.

The queue slot tail pointer (TQ) points to the next request designated to be sent out from the queue slots 208 to external memory. Typically, the tail pointer TQ will point to the oldest request in the queue slots 208, but the priority logic 252 within the bus controller logic 202 may assign a higher priority to a "younger" request in the queue slot, and send that request out before the oldest request. Memory access may be prioritized according to memory access type using the pending stacks 204 and 206, the priority logic 252 and a priority multiplexer (MUX) 210. The load and DMA pending stacks 204 and 206 each store pointers (HDQs) to slots in the queue stack 208 that hold corresponding load or DMA memory accesses, respectively. The head pointer (HP) of each pending stack (as distinguished from the head pointer HQ of queue stack 208) points to the next pending stack slot that can receive a memory access of the type accepted by the pending stack. Each pending stack tail pointer (TP) points to the pending stack entry preferably corresponding to the oldest memory access of the type stored in the pending stack. Through control of the priority MUX 210, the priority logic 252 in the bus control logic 202 determines which pending stack will send its queue pointer entry HDQ (pointed to by the corresponding pending stack tail pointer TP) to the queue slots 208. For example, if DMA accesses are of a higher priority than load accesses, then the queue stack pointer HDQ stored in the DMA pending stack (that is pointed to by the DMA pending stack tail pointer) will be selected, and forwarded to the queue slots 208. The HDQ queue pointer from the DMA pending stack will select the indicated queue slot for transfer out to the memory bus 110. The use of multiple pending stacks for different types of memory access requests and the prioritization of such requests is implemented in processors such as the i960®CF, manufactured by the assignee of the present invention.

Figure 3A:
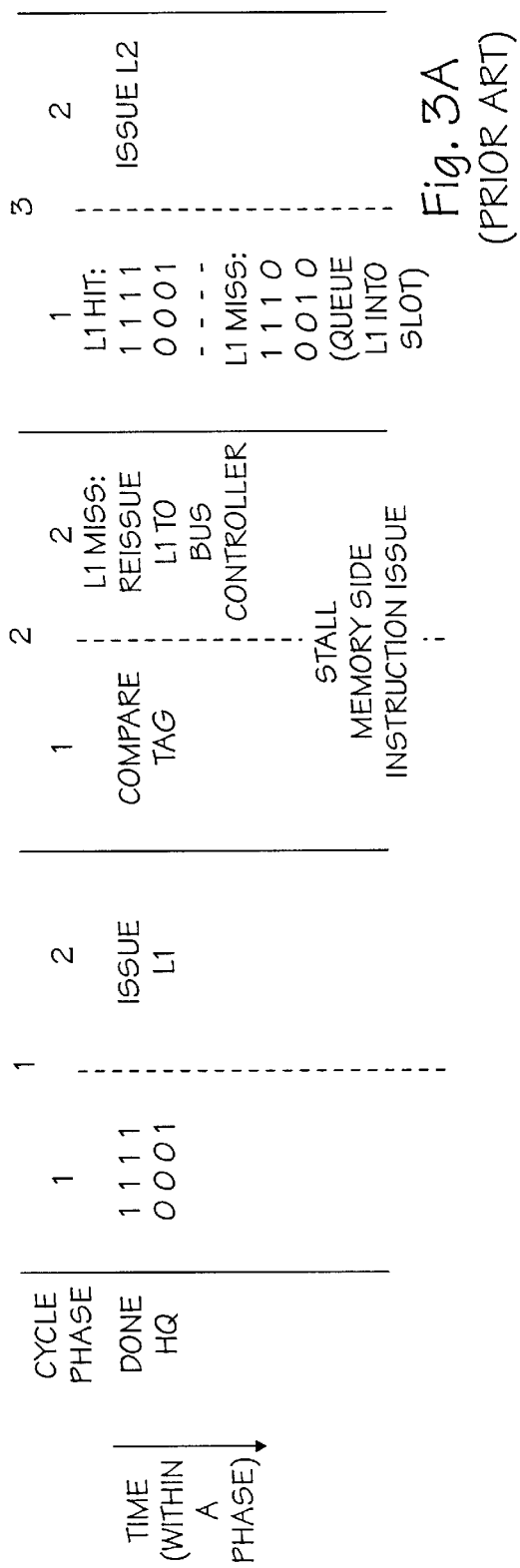
FIG. 3A is a timing diagram illustrating the handling of cacheable load operations by a conventional bus controller.
Figure 3B:
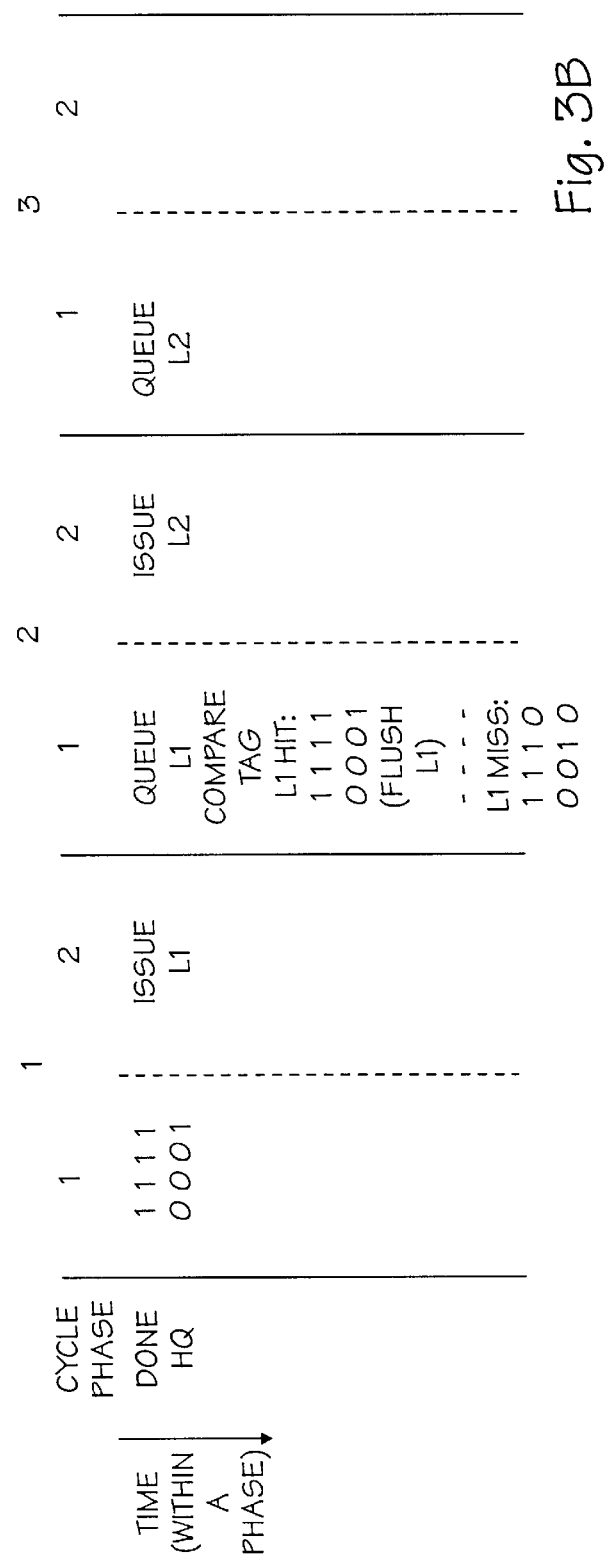
FIG. 3B is a timing diagram illustrating the handling of cacheable load operations by the bus controller of the present invention.

FIGS. 3A and 3B are timing diagrams that illustrate the handling of cacheable load operations by the prior art (FIG. 3A) and the present invention (FIG. 3B). One skilled in the art will recognize that the present invention is not limited to cacheable load operations, and that the following discussions may be generalized to other cacheable memory access requests, such as store operations, among others.

Referring to FIG. 3A, assume that the bus controller queue slots are initially empty. In that case, the DONE vector is set to 1111 and the corresponding head pointer HQ is set to 0001 to indicate that slot 0 of the queue slots is designated to receive the next memory access request issued by the CPU core. During cycle 1, a cacheable load operation L1 is issued.

During cycle 2, tag comparison logic in the cache determines whether the address of the issued memory access operation hits the cache. According to the prior art, upon detecting a cacheable memory access request, the cache asserts a memory scoreboard signal to stall the issuance new memory side instructions by the CPU core.

In the prior art, only cacheable memory accesses that miss the cache are allowed to be issued to the bus controller. In the example of FIG. 3A, after the tag comparison has been performed, the cacheable access L1 is reissued to the bus controller only if the load operation L1 misses the cache. In this case, the memory access request is stored in slot 0 of the queue stack as indicated by the head pointer Q of cycle 1. When L1 is pushed onto the queue stack, the DONE bits are updated to 1110, and the head pointer HQ to 0010 to indicate that queue slot 0 is occupied and that queue slot 1 is designated to receive the next memory access request that must be sent out to external memory.

After the tag comparison has been performed and the queue slots allocated as a result of the comparison, the bus controller queue is ready to handle the next instruction. Thus, the tag comparison logic in the cache "unscoreboards" memory side instruction issue, thereby permitting a second memory access request L2 to be issued in the second phase of cycle 3.

Figure 4:
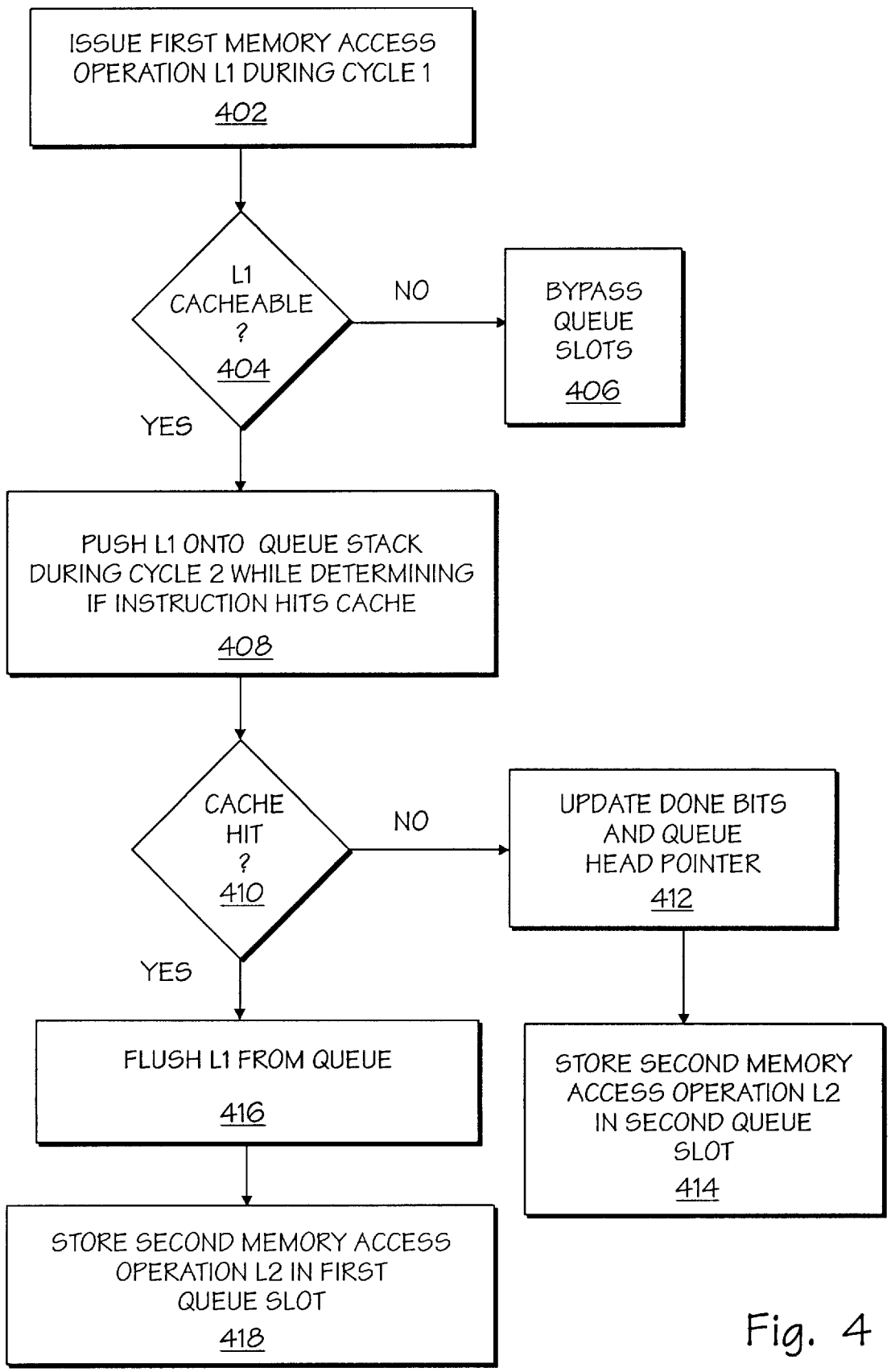
FIG. 4 is flow chart illustrating the handling of chacheable load operations shown in FIG. 3B.

The present invention decouples the issue of a memory access request from the tag comparison performed on a previous cacheable memory access operation. As shown in FIG. 3B and FIG. 4 again assume that the queue slots 208 are initially empty in cycle 1. During cycle 1, a memory access operation L1 is issued at step 402. If the memory access is not cacheable (step 404) and all queue slots are empty, then it is known that the noncacheable access data will not be retrieved from the cache and that the memory access can bypass the queue slots 208 and be sent directly out to the memory bus 110 (step 406). Thus, the DONE update logic 254 will not change the DONE bits.

If, however, the memory access is cacheable, then, unlike conventional processors, the bus controller 106 of the present invention pushes the cacheable load operation onto the queue stack 208 in the first phase of cycle 2 even before the tag comparison is completed (step 408). During that first phase, the tag comparison is performed. If L1 hits the cache 104, then L1 is flushed from the queue 208 preferably by not adjusting the DONE bits and the queue head pointer HQ (steps 410 and 416). Thus, the DONE bits show all slots as free, and the queue head pointer HQ indicates that the next load operation to be queued should be stored in slot 0 to overwrite L1 (step 448).

If, however, L1 misses the cache 104, then the DONE update logic 254 updates the DONE bits and, in response, the head pointer logic 250 updates the queue head pointer HQ to indicate that queue slot 0 is occupied and preferably slot 1 is the next slot to receive a memory access request that must be sent out to external memory (steps 410, 412 and 414). Thus, during cycle 2, L1 is pushed onto the queue before the tag comparison, and the DONE bits and pointers are updated to prepare the queue slots for receipt of the next memory access request. Further, unlike conventional processors, the bus controller 106 of the present invention does not stall instruction issue, but rather allows the subsequent memory access request L2 to issue during cycle 2. If L2 is a cacheable or a noncacheable memory access, then during the first phase of cycle 3, it is stored in queue slot 0 if L1 hits the cache, or queue slot 1 if L1 misses the cache. If L2 is a cacheable memory access, then during phase 1 of cycle 3, the tag comparison is performed and the stack pointer is manipulated appropriately, as in cycle 2.

From the foregoing, it can be appreciated that the present invention provides an efficient means for maintaining back-to-back issue of memory access instructions. The advantages of the present invention are highlighted when one considers other potential solutions for achieving back-to-back issue. For example, the bus controller queue could include a dummy slot for storing a memory access request before the tag comparison is completed, thus allowing instruction issue in the next cycle. However, this implementation presents a number of disadvantages. First, management of the dummy slot increases hardware complexity. Second, because each request in the bus controller queue must be serviced before an interrupt handler in the processor can handle a pending interrupt, interrupt latency increases because of the additional time required to service the dummy slot.

It will be appreciated that various modifications and alterations might be made by those skilled in the art without departing from the spirit and scope of the present invention. In particular, one skilled in the art will recognize that the present invention is not limited to the use of head and tail pointers, but may be implemented using any logic that implements the functionality of the timing diagram of FIG. 3B. For example, in a simple implementation the queue stack 208 may be implemented as a cyclical queue. The invention should, therefore, be measured in terms of the claims which follow.

What is claimed is:

1. In a microprocessor having a processor core, a cache and a bus controller, the bus controller having a plurality of queue slots for storing pending memory access operations, a method for flushing cacheable memory access operations from the bus controller queue to increase instruction throughput, the method comprising the steps of:

issuing a first memory access operation in a first cycle;

if the first operation is cacheable:

in a single second cycle, pushing the first memory access operation into a first queue slot while determining if the first memory access operation hits the cache;

if the first operation hits the cache, flushing the first memory access operation from the queue;

issuing a second memory access operation;

storing the second memory access operation in the first queue slot if the first memory access operation hits the cache; and storing the second memory access operation in a second queue slot if the first memory access operation misses the cache.

2. The method of claim 1, wherein the flushing step occurs in the second cycle.

3. The method of claim 1, further comprising the step of, if the first memory access operation misses the cache, incrementing a queue slot head pointer to point to the second queue slot.

4. The method of claim 1, wherein the second cycle immediately follows the first cycle.

5. The method of claim 4, wherein the pushing step occurs in a first phase of the second cycle and the second memory access operation is issued in a second phase of the second cycle.

6. The method of claim 5, wherein the flushing step occurs in the first phase of the second cycle.

7. The method of claim 1, further comprising the step of bypassing the queue and sending the first memory access operation directly to an external bus coupled to the bus controller if the first operation is noncacheable and the queue is empty.

8. In a microprocessor having a cache and a processor core for issuing memory access operations, a bus controller comprising:

a queue having a plurality of queue slots for storing pending memory access operations; and bus controller logic issuing a first cacheable memory access operation in a first cycle; in a single second cycle, pushing the first cacheable memory access operation into a first queue slot while determining if the first cacheable memory access operation hits the cache; and flushing the first cacheable memory access operation from the queue if the first cacheable memory access operation hits the cache, wherein, responsive to the processor core issuing a second cacheable memory access operation, the bus controller logic:

stores the second cacheable memory access operation in the first queue slot if the first cacheable memory access operation hits the cache; and stores the second cacheable memory access operation in a second queue slot if the first cacheable memory access operation misses the cache.

9. The method of claim 8, wherein the bus controller logic flushes the first cacheable memory access operation from the first queue slot in the first cycle.

10. The bus controller of claim 8, the queue further comprising a queue slot head pointer; and the bus controller logic further comprising pointer logic for incrementing the queue slot head pointer to point to the second queue slot in response to the first cacheable memory access operation missing the cache.

11. The bus controller of claim 8, wherein the second cycle immediately follows the first cycle.

12. The bus controller of claim 11, wherein the bus controller logic pushes the first cacheable memory access operation into the first queue slot in a first phase of the second cycle, and wherein the bus controller logic issues the second cacheable memory access operation in a second phase of the second cycle.

13. The bus controller of claim 12, wherein the flushing step occurs in the first phase of the second cycle.

14. The bus controller of claim 8, the bus controller logic further comprising bypass logic for bypassing the queue and sending the first cacheable memory access operation directly to an external bus.

15. A computer system comprising:

an external memory device for storing information;

an external bus coupled to the external memory device; and a microprocessor including:

a processor core for issuing memory access operations;

a cache coupled to the processor core; and a bus controller coupled to the processor core, the cache and the external memory bus, the bus controller comprising:

a queue having a plurality of queue slots for storing pending memory access operations; and bus controller logic issuing a first cacheable memory access operation in a first cycle; in a single second cycle, pushing the first cacheable memory access operation into a first queue slot while determining if the first cacheable memory access operation hits the cache; and flushing the first cacheable memory access operation from the queue if the first cacheable memory access operation hits the cache, wherein, responsive to the processor core issuing a second cacheable memory access operation, the bus controller logic:

stores the second cacheable memory access operation in the first queue slot if the first cacheable memory access operation hits the cache; and stores the second cacheable memory access operation in a second queue slot if the first cacheable memory access operation misses the cache.

* * * * *